United States Patent [19]

Margolin

[11] 4,179,124

[45] Dec. 18, 1979

[54] ELECTRONIC VIDEO GAME

[76] Inventor: Jed Margolin, 96 Devonshire Ct., Somerville, N.J. 08876

[21] Appl. No.: 859,937

[22] Filed: Dec. 12, 1977

[51] Int. Cl.² .............................................. A63F 9/02
[52] U.S. Cl. ............................... 273/101.2; 273/85 G; 273/DIG. 28
[58] Field of Search ......... 273/85 G, DIG. 28, 101.2, 273/237; 340/723–725

[56] References Cited

U.S. PATENT DOCUMENTS

| | | | |
|---|---|---|---|
| 3,778,058 | 12/1973 | Rausch | 273/DIG. 28 |
| 4,006,898 | 10/1977 | Greaf et al. | 273/85 G |
| 4,016,362 | 4/1977 | Bristow et al. | 273/85 G |
| 4,026,555 | 5/1977 | Kirschner et al. | 273/85 G |
| 4,034,983 | 7/1977 | Dash et al. | 273/85 G |
| 4,045,789 | 8/1977 | Bristow | 273/85 G |
| 4,053,740 | 10/1977 | Rosenthal | 273/85 G X |
| 4,054,919 | 10/1977 | Alcorn | 273/DIG. 28 |
| 4,095,791 | 6/1978 | Smith et al. | 273/85 G |
| 4,112,422 | 9/1978 | Mayer et al. | 273/85 G X |
| 4,119,955 | 10/1978 | Nichols | 273/85 G X |

OTHER PUBLICATIONS

*Consumer Reports,* "Video Games", Nov. 1977, pp. 630–634.

*Primary Examiner*—Vance Y. Hum
*Attorney, Agent, or Firm*—Lowhurst & Aine

[57] ABSTRACT

An electronic game in which a standard television receiver may be a terminal is fed by an interface device which is in turn interconnected to first and second controllers, the first controller interacts with a matrix or display memory, which may be a read-only-memory (ROM) which is controlled by a matrix selector register. The first controller also has a matrix address register which feeds it. The second controller is fed by a dot address register. The matrix memory stores the digital data to control the matrix image desired to be displayed. The controller contains X and Y display address counters which indicate the position of the video beam on a grid at any given time. When the addresses of the beam coincide with the addresses of the positions stored in the memory as determined by a comparator the matrix will be displayed. A similar structure is utilized for a dot display (normally smaller) matrix in which the X and Y display address registers have a dual function working for both dot display and matrix display positions of the game and use a second comparator to control the output of the dot display.

8 Claims, 18 Drawing Figures

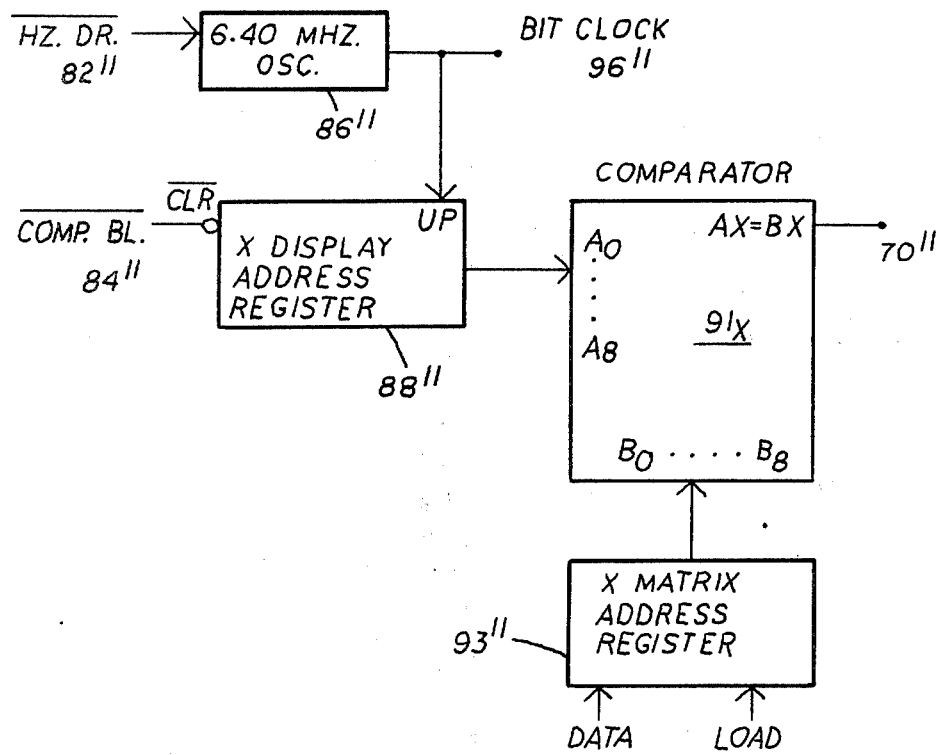
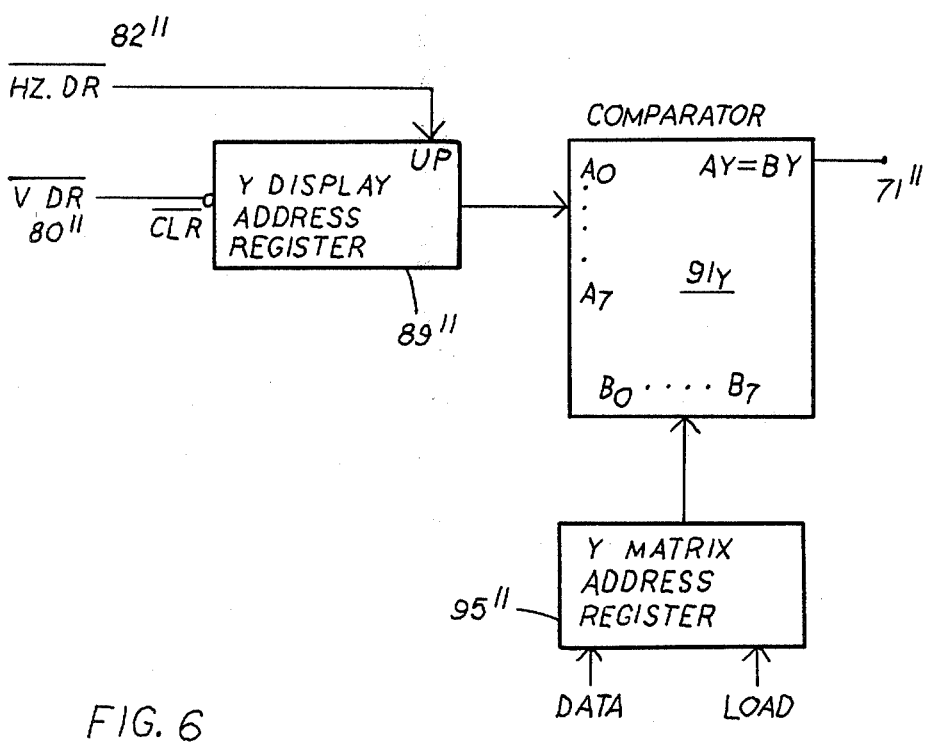
FIG. 6

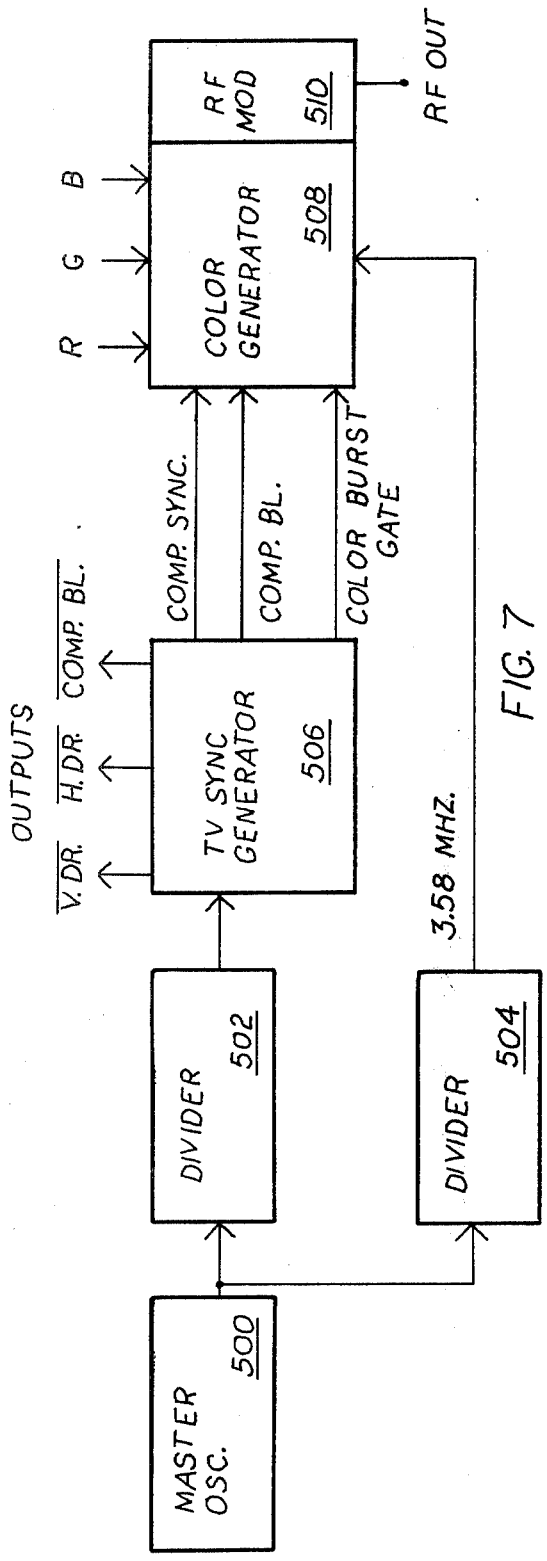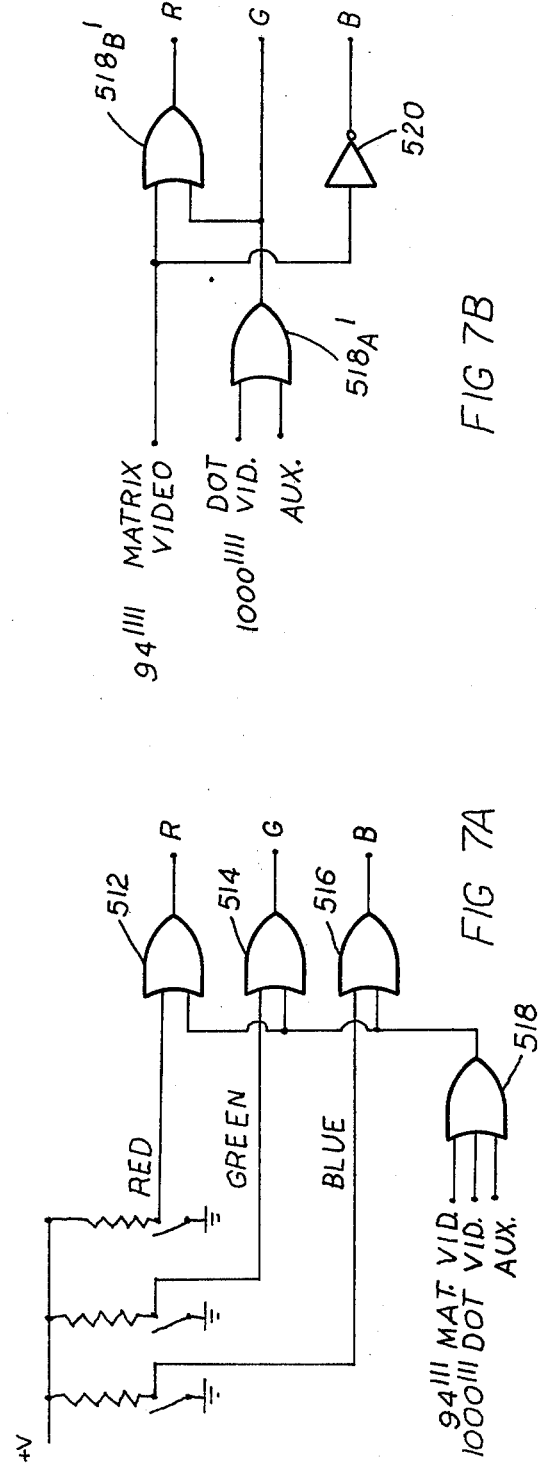

LSB

| WORD | CONTENTS | |
|---|---|---|
| | BINARY (LSB) | HEXIDECIMAL |
| 0 | 1100 0000 | C0 |
| 1 | 1110 0000 | E0 |
| 2 | 0111 1110 | 7E |
| 3 | 0011 1111 | 3F |
| 4 | 0011 1111 | 3F |
| 5 | 0011 1100 | 3C |
| 6 | 0011 1000 | 38 |
| 7 | 0001 1000 | 18 |

EXAMPLE OF ROM CONTENTS FOR SPACE SHIP

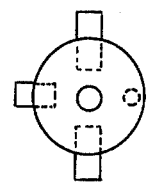
FIG. 13B
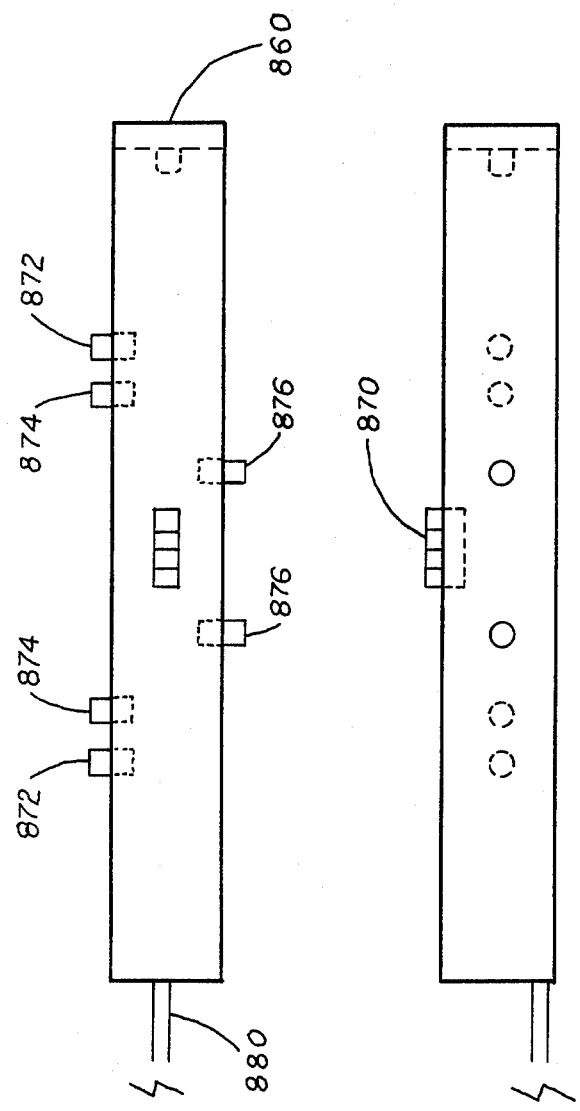
FIG. 13
FIG. 13A

ELECTRONIC VIDEO GAME

BACKGROUND OF THE INVENTION

1. Field of the Invention

The present invention relates to a device for controlling the display of a standard television receiver, either black and white or color. More particularly the present invention concerns a device adapted to be connected to the antenna terminals of a television receiver which is capable of producing a plurality of predetermined displays of particular symbols whose position can be selectively controlled by a player. The present invention relates to various electronic circuitry, including certain logic elements, for generating controllable video signals of a plurality of controllable displays. The present invention also relates to a novel audio output station and manual control for controlling the location on the output tube of the video signals.

2. Prior Art

The basic art to which the present invention relates is both relatively recent and quite voluminous. The commercial utilization of TV games in the mass markets is only a few years old but the diversity of games available and the invention on which they are based is quite astounding.

A brief summary of the more pertinent prior art follows. U.S. Pat. No. 3,778,058 issued in the name of W. T. Rausch shows a game with up to four individual control units and an overlay for the TV screen which can display the necessary paddles and spots for hockey, tennis, ping pong, handball and the like. One or more "spot generators" are utilized which generate "unblanking" signals which when passed through the coincidence gate illuminate spots at the appropriate intersection of the vertical and horizontal signals. The spots are normally a number of horizontal scans. The game circuitry used is horizontal and vertical sync generators, slicers for spot generation, coincidence gates and flip-flops. The player's controls, manipulate manual resistors. The "ball" "puck" or other object is generated in essentially the same manner as the other spots. In essence this game construction uses analog electrical techniques not digital controls.

Another pertinent U.S. Pat. No. 3,728,480 is issued in the name of R. H. Baer. This patent uses techniques similar to those taught in Rausch's patent. Dot generators controlled by potentiometers generate "dot" signals when the horizontal and vertical sync generator signals "intersect." A so-called "crowbar" circuit extinguishes one dot (the target) when its location is coincident with the other (gun) dot. Coincidence is judged by the equal voltage outputs of the dot generators causing the application of a positive signal to the gate of an SCR which extinguishes the first "dot."

U.S. Pat. No. 3,921,161 issued in the name of R. H. Baer teaches a game of the general type shown in previously cited U.S. Pat. Nos. 3,728,480 and 3,778,058 wherein a magnetic tape player which can read into the "game from one or more tape channels to control a spot" generator. The basic game and the spot control are analog and the tape memory is accessable only through a fixed routine.

U.S. Pat. No. 4,006,898 issued in the name of C. Greaf et al shows an analog game of the spot generator type in which there is an automatic "serve" function so that the game need not be reset each time a target marker enters the out-of-bounds region. Target marker position is sensed by voltage level applied to the spot generators. A flip-flop is activated to cause the target market to re-appear and travel in the opposite direction.

U.S. Pat. No. 4,026,555 issued in the name of Wallace Kirschner et al shows a TV game control system utilizing a keyboard, a microprocessor, random access memories and read only memories. The TV raster is digitized into 34,650 discrete areas or bars per raster and for each bar there could be a memory or storage position in a random-access-memory. A display address circuit is utilized to read or write into or out of the random-access-memory. The microprocessor operates in conjunction with a read-only-memory and a second random-access-memory. The microprocessor polls the game control keyboard and the calculator keyboard is controlled by a second read-only-memory. In this digital game system very extensive and expensive memory capacity is utilized to display relatively few objects precisely.

U.S. Pat. No. 4,034,983 issued in the name of G. R. Dash et al illustrates a combined analog and digital technique where passive elements on the TV screen are controlled digitally and active elements on the TV screen are controlled by an analog mapping circuit. The paddles are controlled by potentiometers. The position comparators are formed from analog circuit elements. No significant memory capacity is shown in this patent specification or drawing.

Another patent of interest is U.S. Pat. No. 4,034,990 issued in the name of R. H. Baer which is an improvement on U.S. Pat. Nos. 3,728,480 and 3,778,058 and others. This patent illustrates the utilization of other pre-recorded sources of TV game controls such as video tape or disc either in color or black and white. The output from the pre-recorded source is decoded and applied to the game controller. Other related U.S. patents are: Goldsmith et al No. 2,455,992; Hamada et al No. 3,631,457; Hillberger et al No. 4,020,501; and Bushnell No. 3,793,483. Hamada et al shows dynamic shift registers requiring refreshment used in a display of up to 40 characters per line in an alpha numeric display. Bushnell shows a device for positioning an image on a TV screen utilizing first and second counters.

SUMMARY OF THE INVENTION

The present invention relates to a novel game control system for a standard TV receiver, either color or black and white, which may be either digital or digital and analog wherein a relatively small amount of memory may be used to produce a plurality of high resolution objects on the video screen.

The system utilizes the notion of a digitized TV raster, keeps track of the location of the "electron beam" (even in the blanked state) and stores the location and configuration of the objects to be displayed in memory. The memory used may be a random-access-memory, read-only-memory or other configuration and combinations of them which may accomplish the same object by techniques well known to those skilled in the art.

The size of the memory utilized will be directly related to the size of the object or objects to be displayed and not related to the number of discrete "spots" utilized on the raster.

In one embodiment of the invention, all functions of the game will be performed digitally through a novel arrangement of comparators, registers, counters, flip-flops, decoders and memory devices.

In another embodiment of the invention the game, utilizes the conventional analog voltage signals to trigger a plurality of monostable multivibrators which in turn drive an "AND" gate which sends a signal to the TV interface, thereby producing a "dot" display. In displaying the matrix digitally from an analog input, the equality of the analog signals can be judged and then be used to trigger a bit clock to drive either the matrix read out from the memory or register depending on the technique used for storing the matrix information.

In another embodiment of the invention, a data selector may be used which would have as input the data from X and Y address registers and matrix selector register from the "players." The output of the data selector would go to the X and Y matrix address registers and the matrix selector register.

In still another embodiment of the present invention, various background colors or white may be present or the entire screen may be flashed after the coincidence of events usually known as a "hit."

In still another embodiment of the invention, each game player has its own control panel which contains audio output equipment and which is physically formed in the shape of a "joystick" or aircraft control. In this embodiment of the game, the player's controls are located on the outer periphery of the "joystick" cylinder.

In another embodiment of the present invention a parallel-to-serial shift register may be used in conjunction with another memory device so that the other memory device keeps the shift register loaded with the correct data to be shifted out to video output as required. In this embodiment the matrix may be stored in a more remotely located memory but presented as needed to the shift register ahead of the next horizontal scan trace. In this embodiment the size of the matrix to be displayed and the number of matrixes to be displayed is limited only by the storage capacity of the remote memory and the size and speed of the shift register.

DESCRIPTION OF THE DRAWINGS

FIGS. 6 and 6A show a fourth embodiment of the present invention in logic diagrams for an M by N matrix display in which the X display address and X matrix address is compared and logically added to the compared Y display address and Y matrix address.

FIGS. 7 and 7A show two embodiments in which the present invention may be practiced with a color television receiver.

FIGS. 13, 13A and 13B illustrate another aspect of the present invention showing three views of control section or joystick used in connection with the present invention.

DESCRIPTION OF THE INVENTION

Figure 1:
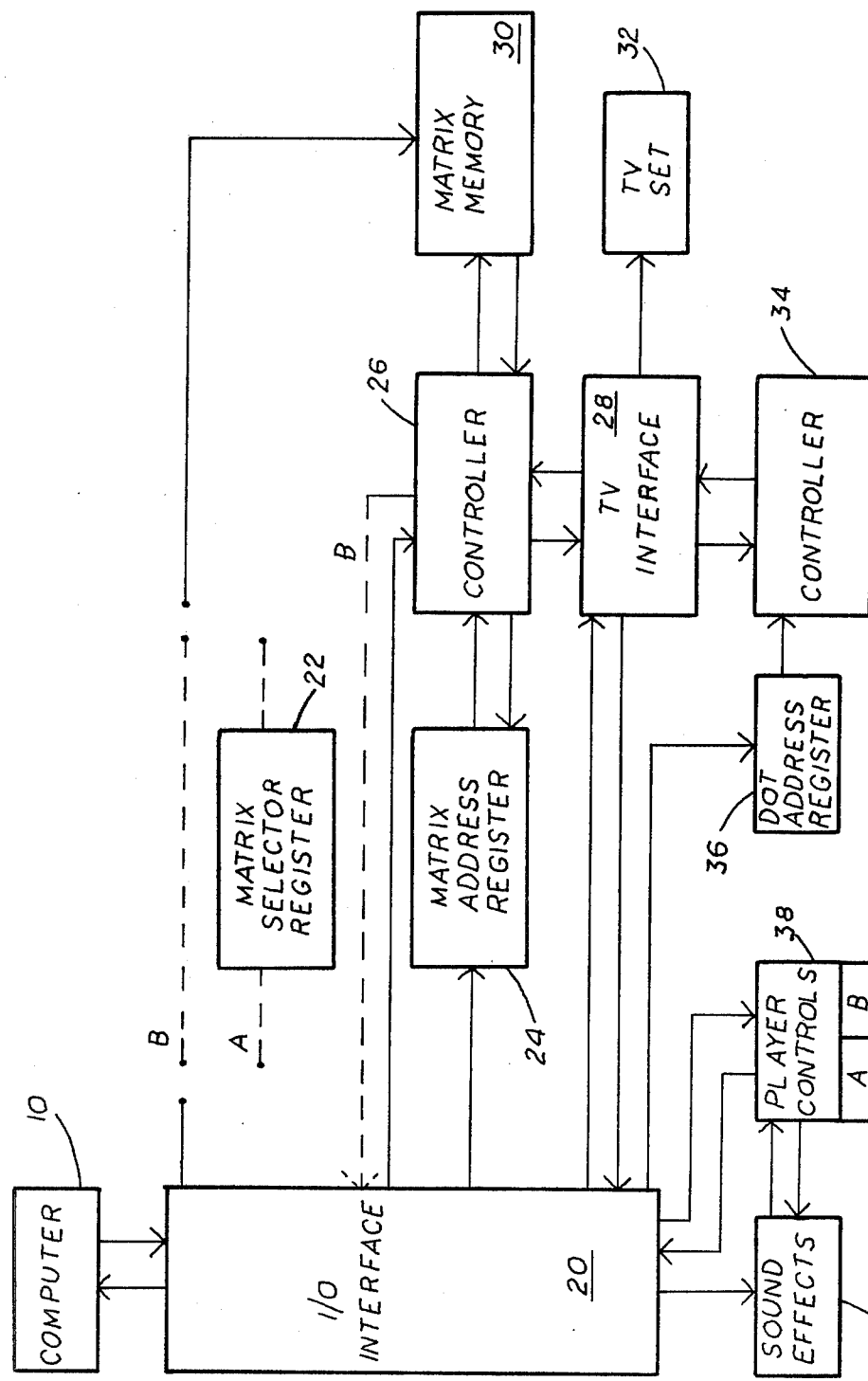
FIG. 1 shows a block diagram of the present invention showing the basic building block of the present invention.

The present invention relates to a novel TV game for implementation on a home TV screen either color or black and white. To play a number of possible games using the present invention it is desirable but not necessary to employ a small personal computer of the type known as Kim 1 or Commodore 2001. Other microprocessors or larger units can be employed to play the games possible in conjunction with the present invention.

As with most commercial TV games, the present invention takes as a "given" the standard television receiver circuitry of the United States or any other country. Because the standards differ, the present invention will be described in conjunction with the standard U.S. television receiver system. Those skilled in the art will recognize that the present invention can be successfully utilized in conjunction with the standard systems of other nations.

A basic discussion of television receiver function is found in *RCA Transistor Thyristor & Diode Manual*, 1971, pages 175–188 and in *The Encyclopedia Britannica* (1973), Volume 21, "Television" pages 796–810 both of which are incorporated herein by reference. As is well known the U.S. standard television receiver has 525 horizontal scan lines divided into two fields of 262.5 lines per field. It takes 63 microseconds to scan one line of the receiver of which about 10 microseconds are utilized for the horizontal flyback. There are 60 fields per second so that the vertical flyback time must be completed 60 times per second or once every 17 milliseconds with a flyback time of about 1 millisecond. The aspect ratio of the standard screen is 4×3. In discussion the location of the "beam" of the TV electron gun, is treated as existing when it is "blanked." Actually during the time the screen is dark (beam blanked) there is no beam only the scanning signals exist. Nevertheless it is frequently convenient to think of the beam as a moving "blanked" beam.

It is useful to be able to put any display on essentially any position of the screen. To do this, it is convenient to digitize the screen. Of the available 525 lines, only about 480 are really available for use because of flyback time, synchronization signals and the like. Because of the 4×3 aspect ratio, 480 horizontal lines or vertical positions correspond to 640 possible horizontal positions. To display a square matrix in a fully interlaced display of 480 lines would require 640 positions traversed in about 50 microseconds which corresponds to a bit frequency of 12.8 megahertz and a bandwith of 6.4 megahertz. These requirements are beyond the RF and IF capabilities of most commercial TV receivers.

Another choice is to use 240 lines (only whole number division of the lines is possible since the lines exist at discrete positions). Using the 4×3 aspect ratio, yields 320 possible horizontal positions (640 positions could be used but the requisite bandwith is not currently available in TV sets unless the RF and IF stages of the receiver are by-passed. By-pass will also require the game to produce its own video signal (in a demodulated form) and a convenient square matrix shape which remains undistorted in rotation and provides the highest possible resolution for the display. Ratios built around 160, 120 etc. lines are possible but do not offer the resolution or the ease of matrix placement.

Since 240 by 320 is the optimum digitization of the TV receiver screen using each field to display a different object consistent with the use of receiver RF and IF stages, it is the one chosen for current practical implementation although other methods could be used. Since this digitization yields a total of 76,800 possible display points of the screen, it might appear that one bit of memory per point would be necessary, thereby requiring 76,800 bits of relatively fast memory for a two object display. Such memory cost is of course prohibitive for practical mass commercial utilization at current memory prices. However since most objects to be displayed in TV games or instructional efforts are relatively small in size, it is possible to use limited amounts of memory storage capability available at reasonable prices to display the objects anywhere on the digitized screen.

The present invention will be discussed in detail in connection with one implementation as a space war game, but the invention is clearly not limited to that game or even to any game involving two players.

FIG. 1 illustrates the system block diagram for an embodiment of the invention. A standard TV receiver 32 is driven by a TV interface member 28 which in turn has input and output connections to first and second controllers 26 and 34. The object to be displayed is envisioned as a matrix to be displayed as shown for example in FIG. 13. The matrix display may be converted into memory through a memory device 30 which may be a random-access-memory, a read-only-memory, a shift register or specified capacity in the micro-processor 10 (or other computer) or any combination of them. Since more than one matrix may be stored (i.e., to display a variety of objects) a matrix selector registor 22 may be used to control the matrix memory as shown in full and dotted line in FIG. 1 depending on where the matrix display configuration is stored.

The matrix memory 30 (or the computer 10 through its Input-Output port or interface 20) is keyed or selected and then interacts with the first controller 26. The dotted line connections show matrix memory stored in the computer 10. The solid line connections show the matrix memory stored in memory external to the computer 10. The TV interface 28 communicates with the Input-Output interface 20 which in turn communicates with the computer 10. The Input-Output interface 20 also communicates with the player controls 38 which are shown with two control modules A42 and B44 respectively. The sound effects generator 40 is driven by the Input-Output interface 20 and interacts with the player controls 38. The block diagram shown in FIG. 1 illustrates the general operation of the game by showing the interconnection of the major functional components. Games can be played without a computer 10 using the invention whose description will follow.

Figure 2:
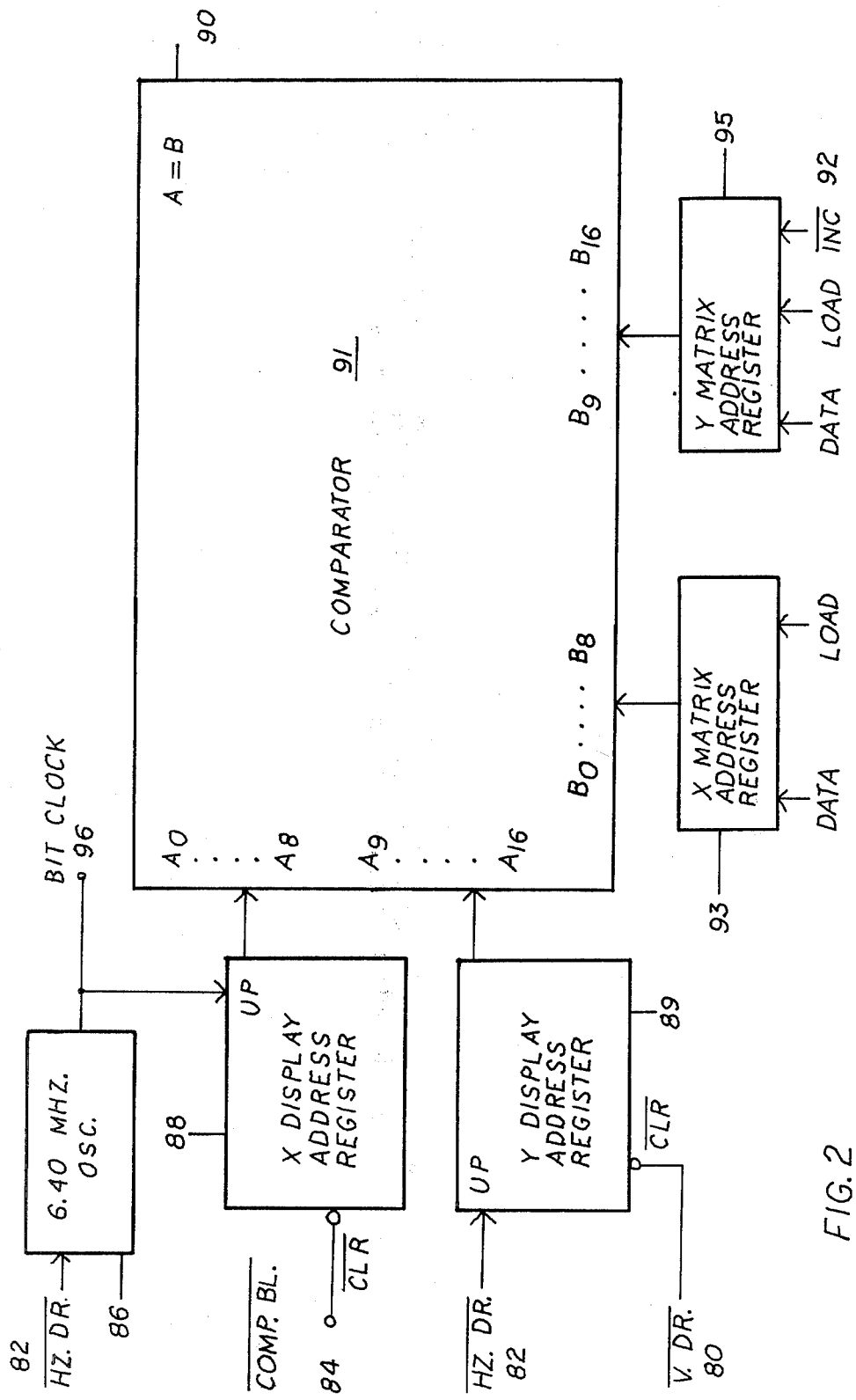
FIG. 2 is a logic diagram of a portion of a first embodiment of the present invention for display of an 8 by 8 matrix.
Figure 3:
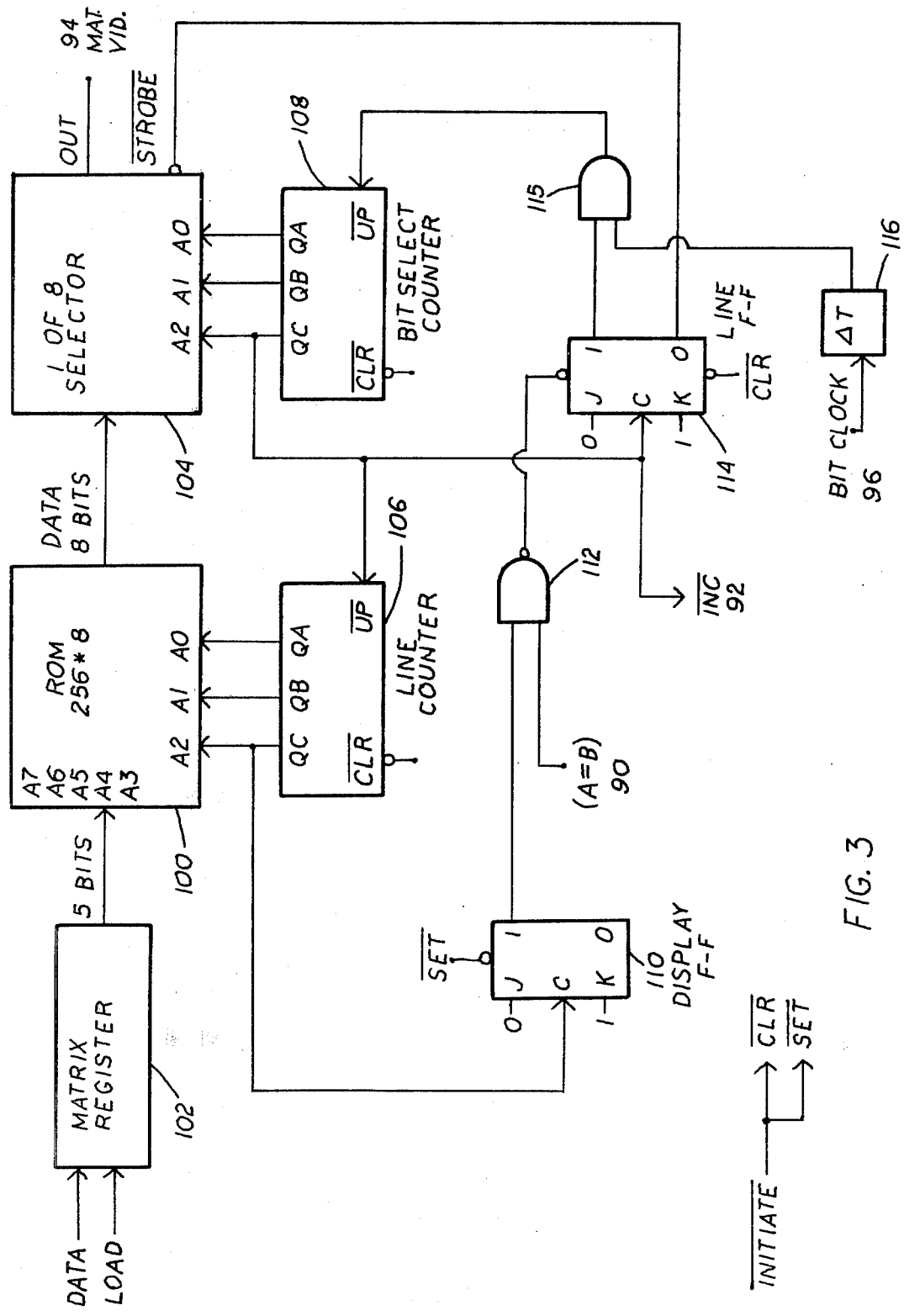
FIG. 3 is a logic diagram of another portion of a first embodiment of the present invention for display of an 8 by 8 matrix.
Figure 4:
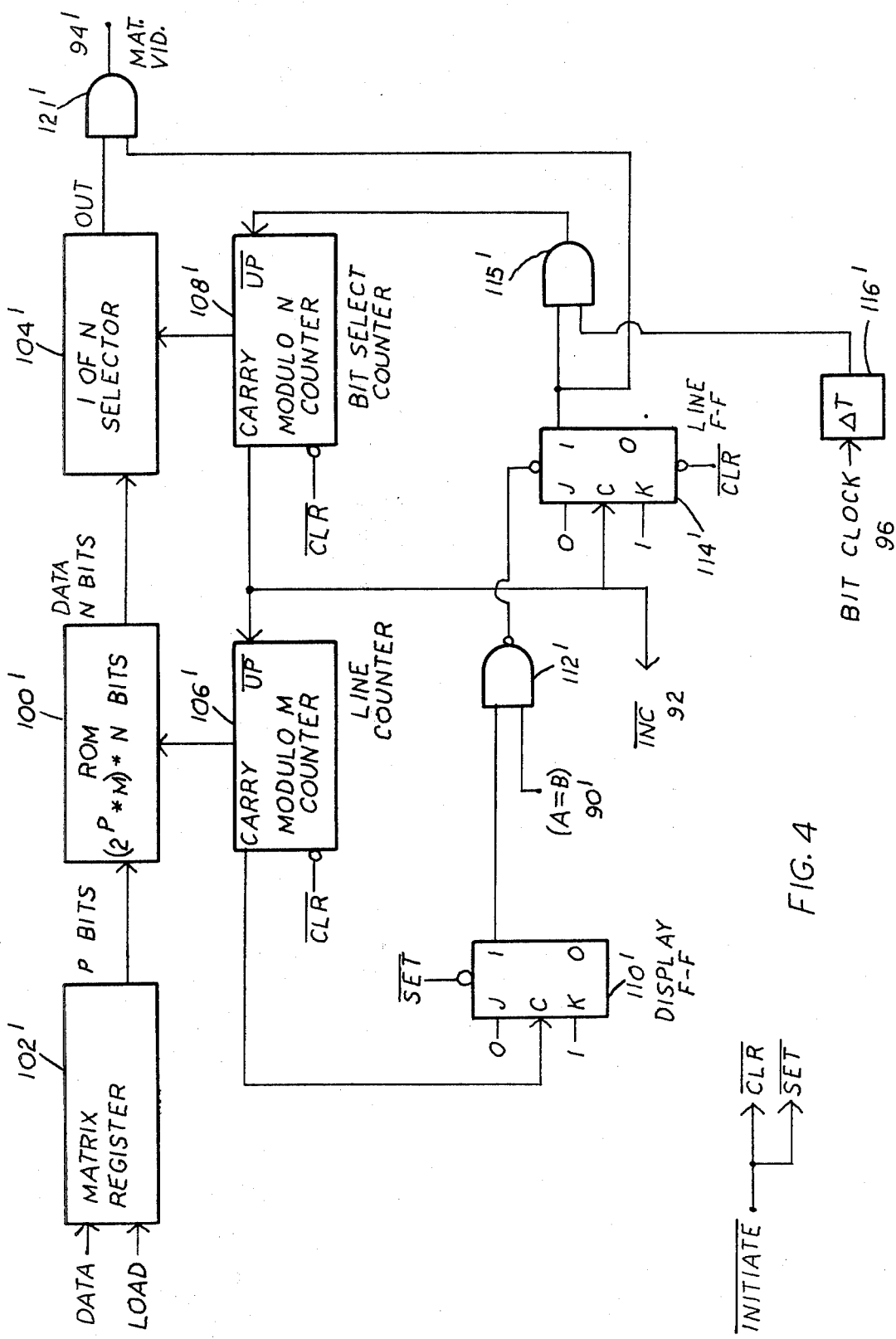
FIG. 4 shows a logic diagram for a second embodiment of the present invention where the matrix to be displayed is an M by N matrix (where M is less than 320 and N is less than 240).

FIGS. 2, 3, 4, 6A and 6B show implementation of one embodiment of the present invention using a read-only-memory 100, 100′, 100″ as shown in FIGS. 3 and 4 respectively. The FIG. 3 implementation is for an 8 by 8 matrix while the FIG. 4 implementation is for a M×N matrix with different matrices. The basic discussion which follows applies to both implementations.

A 6.40 megahertz oscillator 86 provides the basic bit rate for the logic networks. It is synchronized with the horizontal drive of the TV synch generator from line 82 and is used as the bit clock 96 for the X display address register 88 and for the matrix display logic. The composite blanking signal is also fed to the X display address register which clears it which is a mere bit counter (it must count to 320 or down from 320). An eight bit counter 89 for the Y display address register is cleared during the vertical drive and counts to 240. Thus counters 88 and 89 indicate the position of the CRT electron beam at any point on the 240 vertical by 320 horizontal coordinate system. Obviously different sized counters would be used if a 120 by 160 or other combination were to be used.

The matrix to be displayed is stored in the ROM 100 100′, 100″. A ROM organized as 256×8 can store 32 different 8×8 matrixes. While ROM's are shown, random-access-memories, (RAMS) may be employed.

The matrix register 102, 102′, 102″, the X (horizontal) matrix address register 93, 93″, and the Y (vertical) address register 95, 95″ are normally loaded during the vertical interval (flyback). The last register loaded clears the bit select counter 108, 108′, 108″ (shown in the general versions as a Modulo N Binary Counter) and the line counter 106, 106′, 106″ (shown as or Modulo M counter) and sets the display flip-flop 110, 110′, 110″.

Figure 6A:
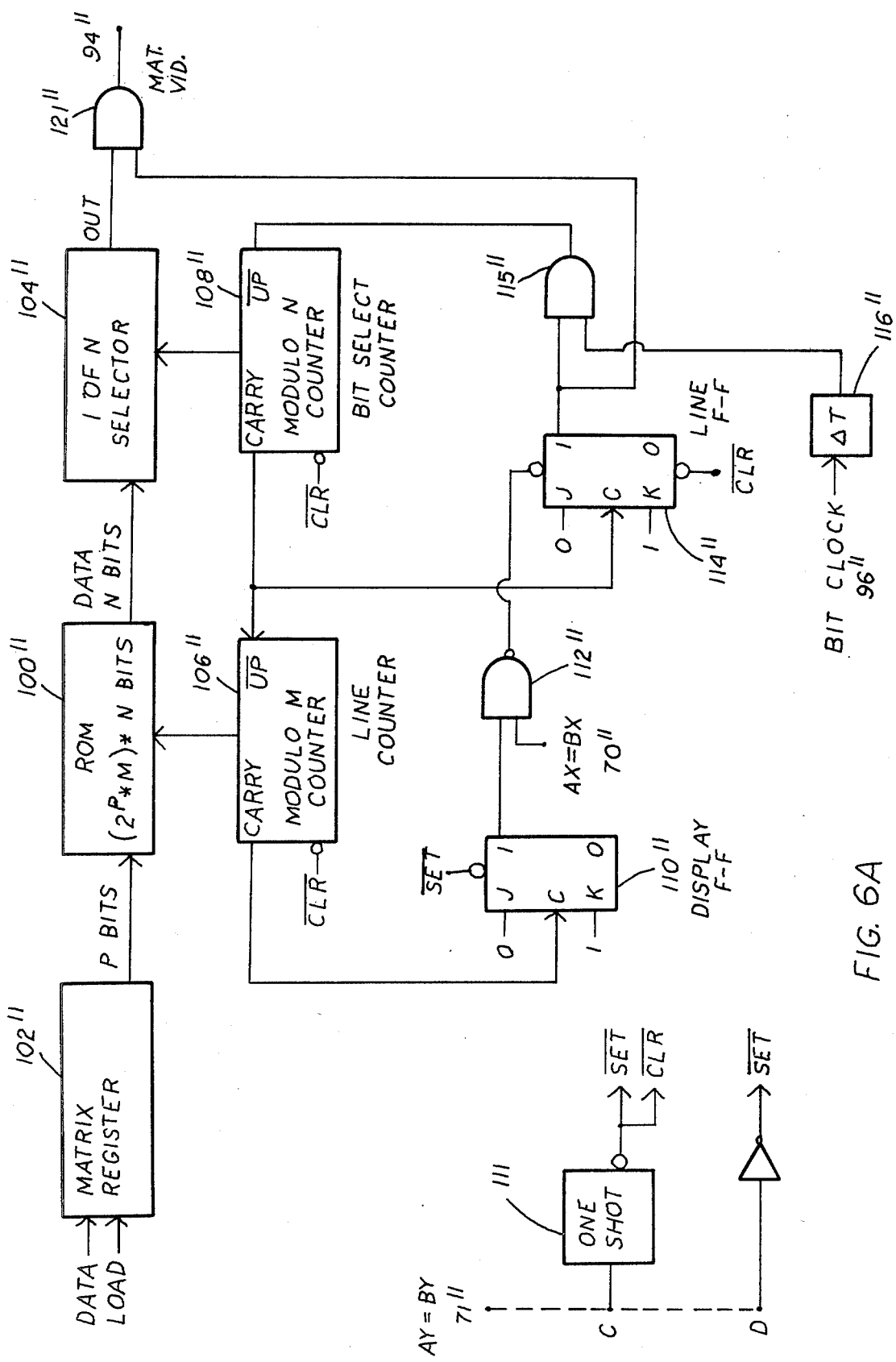

A 17 bit comparator 91 in the FIG. 2 embodiment and two comparators in the FIG. 6 embodiment, one 9 bits, 91x″ and one 8 bit, 91y″ constantly compare the X and Y display addresses. If the display flip-flop 110, 110′, 110″ is set, a pulse is produced when A=B or when Ay=By. This sets the line flip-flop 114, 114′, 114″ (if Ax=Bx) in the FIG. 6, 6A embodiment. The bits of the first word in the ROM are then sequentially selected either by the 1 of 8 decoder 104 or the 1 of N decoder 104′.

If a black and white receiver is used "0" may indicate black (blanked beam) or "1" may indicate white. At the end of number of bits in the matrix, the bit select counter 108, 108′, 108″ will again be in its "0" state and will increment the ROM line counter 106, 106′, 106″, turn off the line flip-flop 110, 110′, 110″ and increment the Y matrix address register 95, 95″. Then at the proper position on the next TV line, the next matrix will be displayed. This sequence continues until all matrix lines have been displayed and then resets the display flip-flop 11, 110′, 110″.

The FIG. 6, 6A embodiment of the invention requires an additional monostable multivibrator 111 (one shot) if it is desired to always eliminate a single field display error if the line counter 106″ and the bit select counter 108″ get out of synchronization. This embodiment allows the Y matrix address register 95′ to be a simple latch instead of one requiring its contents to be incremented.

Figure 9:
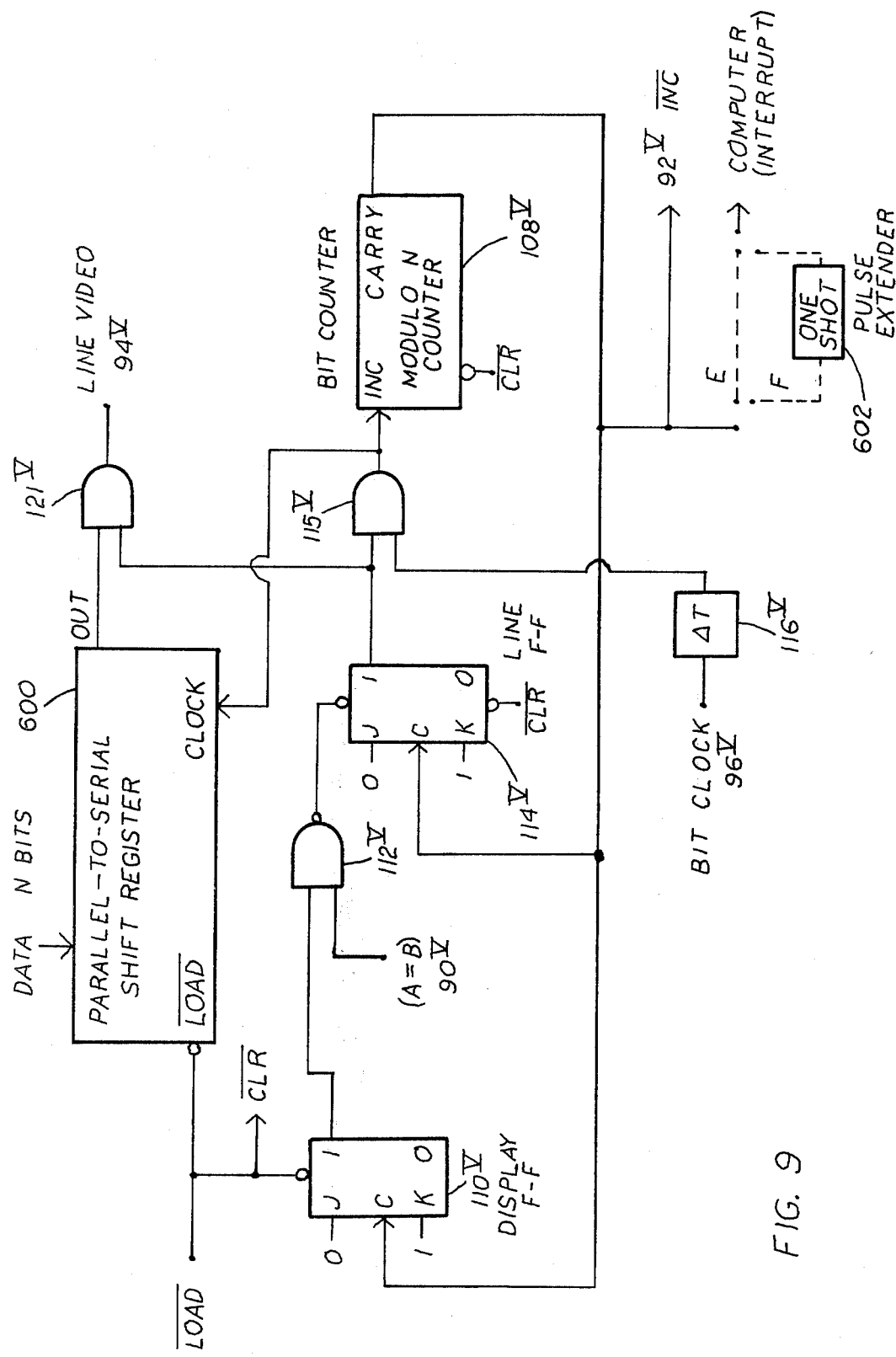
FIG. 9 shows a fifth embodiment of the present invention in a logic diagram.

FIG. 9 shows an embodiment which is meant to be understood in connection with FIG. 1's B option. In essence a parallel to serial shift register 600 along with the computer memory replace the ROM or RAM. The circuit operates by having the computer 10 load the X and Y matrix address registers 93, 95 of FIG. 2 with the address of the upper lift corner of the matrix to be displayed. The first matrix line of N bits is loaded into register 600 which then controls the display.

When the display address equals the matrix address (A=B), the shift register 600 shifts the bits serially to produce a video signal. After N bits have been displayed, the device 600 generates a computer signal directing the computer 10 to load the next matrix line and it generates a signal to increment the Y matrix address register 95 so that A=B will be generated on the next TV scan line at the proper horizontal position. In this embodiment the nature of the computer game is more readily changed by programming but the basic inventive concept and implementation is similar to that discussed in FIGS. 2, 3, 4, 6 and 6A.

Figure 10:
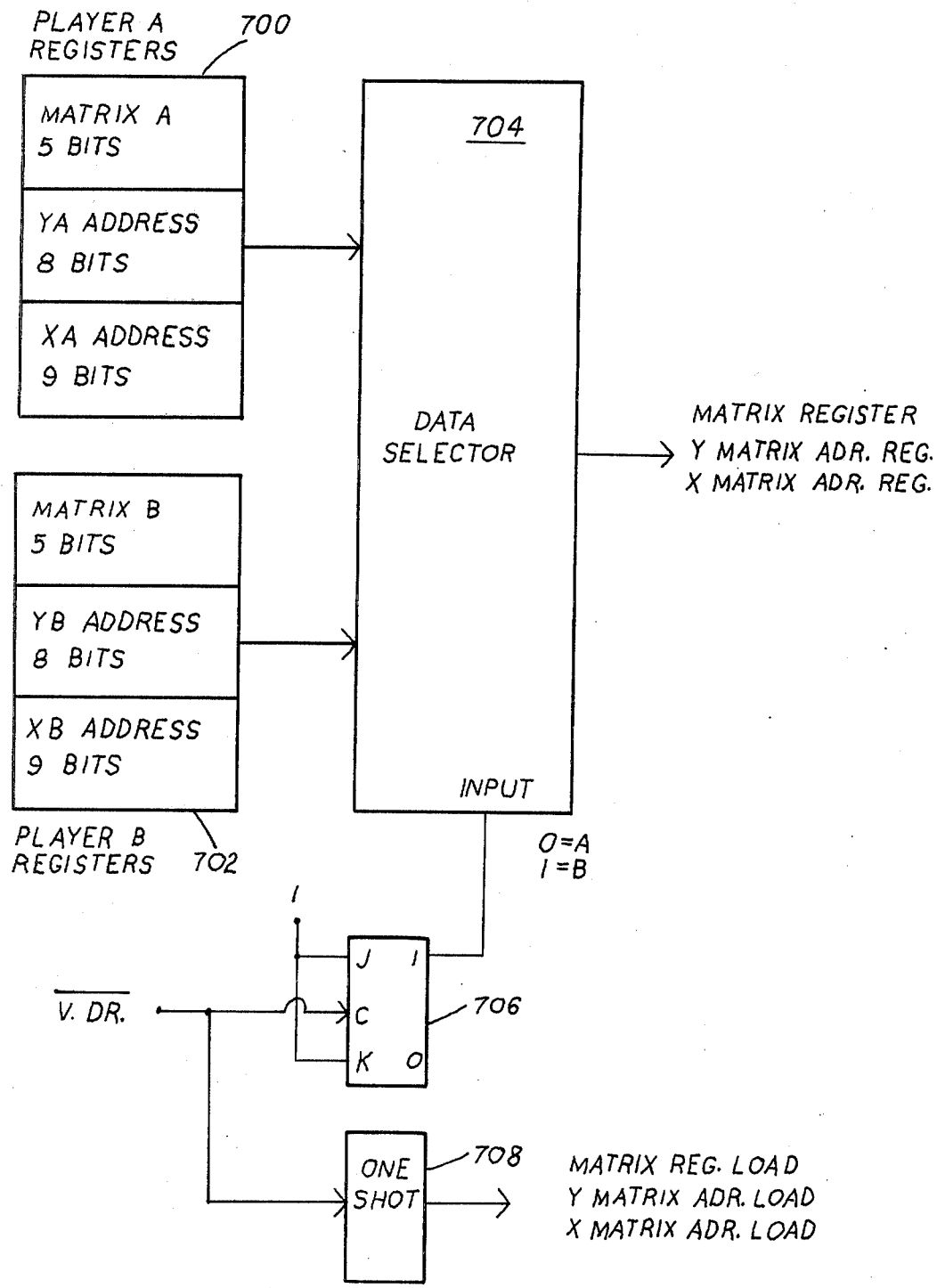
FIG. 10 shows a logic diagram of a sixth embodiment of the present invention in which a data selector is utilized to alternately select the play matrixes and matrix address determined entirely in hardware.

FIG. 10 shows a further modification of the present inventive concept utilizing different player A and B registers, 700, 702 and a data selector 704 which selects the data to be loaded into the matrix register 102, X display address register 88 and Y display address register 89 shown in FIGS. 2 and 3. The play registers are binary counters (normally ganged counters) and the data selector approach requires an additional flip-flop 706 and a one-shot 708.

Figure 11:
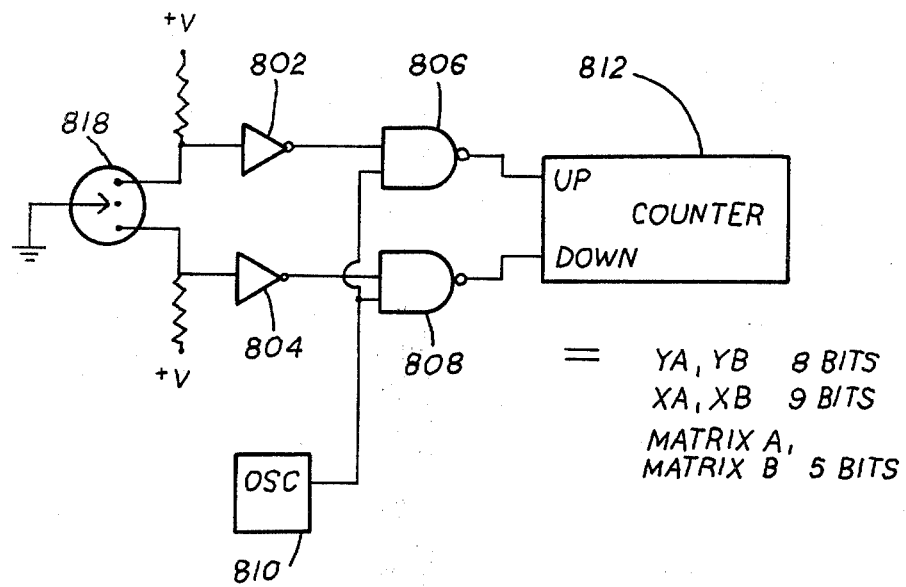
FIG. 11 shows a logic diagram of the control for movement of one of the matrixes displayed in one embodiment of the invention.
Figure 12:
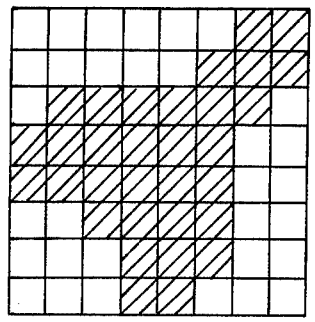
FIG. 12 shows the memory contents for a particular matrix to be displayed.

The Matrix Displays using the Matrix ROM's accept as inputs the number of the matrix to be displayed and its address on the screen. Normally this data is calculated by the computer which then loads it into the display; loading different data on alternate fields produces two independent matrices on the screen. A method of determining and selecting this data in hardware is shown in FIG. 10. A data selector selects and loads the two different data sources on alternate fields. In this implementation the data sources consist of counters which may be incremented or decremented manually as shown in FIG. 11. Incrementing the X counter moves the matrix across the screen to the right; decrementing it moves the matrix to the left. Similarly, incrementing the Y counter moves the matrix down the screen while decrementing it moves the matrix up. A combination of incrementing and/or decrementing the X and Y counters may be used to move the matrix to any desired position on the screen. The Matrix counter selects sequential matrices to be displayed.

While this implementation describes a very simple "game," other "games" can be implemented through the use of hardwired logic. For example, the counters can be adders whose inputs are other registers. Essentially, any game described by a computer program can be implemented by hardwired logic. Although a computer program will normally be the most cost efficient method of implementing a game, there may be instances where it is desired to do it in hardware.

Figure 5:
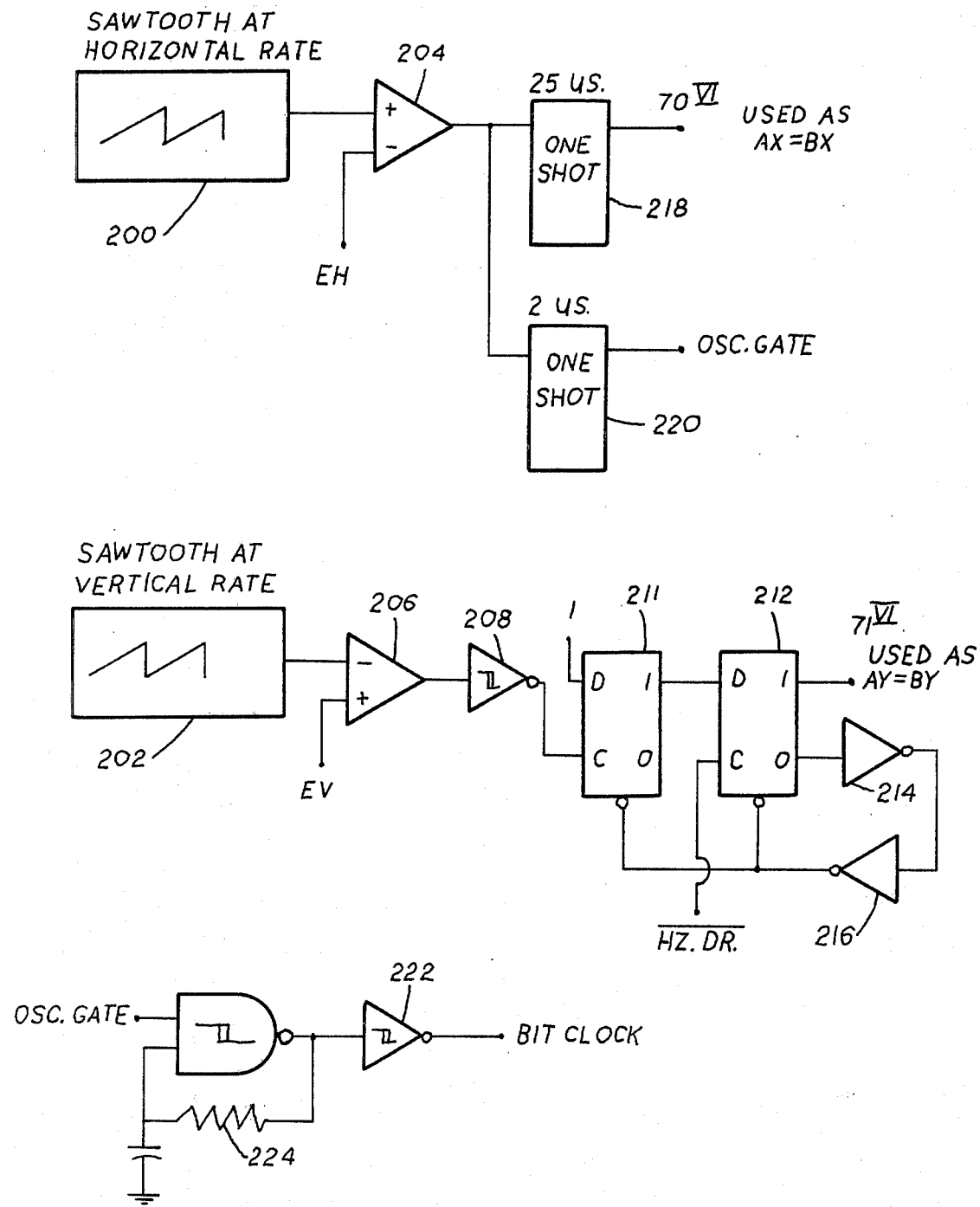
FIG. 5 is a logic diagram of a third embodiment of the present invention showing an analog implemention of the invention.

FIG. 5 shows an analog implementation of the present inventive concept. Using horizontal and vertical delays allows the operator (player) to control the location of a dot on the TV screen. At the end of the desired horizontal delay a one shot 218 is triggered for a time less than the time required for the matrix line to be displayed. At the end of the horizontal delay another one shot 220 is triggered for a time which must be greater than the time required for the matrix line to be displayed but less than the time for one horizontal line.

At the end of the desired vertical delay a pulse is produced which is synchronized to the horizontal drive pulse to produce a pulse to be used $Ay=By$. Analog comparator 206 compares the sawtooth voltage 202 to a player selected voltage EV. Schmitt trigger 208 ensures the purity of the output of the comparator 206. Flip-flop 211 acts as latch and has its output clocked into 212 by the horizontal drive. Inverters 214 and 216 operate as delays or a one shot. The delays, horizontal and vertical may be generated by a variable RC delay circuit or by a voltage controlled time delay produced by generating a ramp and comparing it to an adjustable voltage. The time it takes the ramp voltage to reach a predetermined value is the proportional to the desired delay.

If the vertical delay pulse which is synchronized to the horizontal drive as shown in FIG. 5 is used as $Ay-By$ and the horizontal delay pulse is used as $Ax=Bx$. The matrix selected digitally will be displayed at the location determined by the controllable delay time. In this embodiment, the bit oscillator 220 is synchronized to the horizontal delay pulse so that the first bit in the matrix line will be properly spaced.

FIGS. 7 and 7A show two possible embodiments of the present invention in conjunction with a color receiver. The FIG. 7 embodiment shows an implementation in which the screen has a selectable background color and in which the dots appear as white. In the FIG. 7A embodiment the background is blue, the matrix displayed in red and the dots (torpedo, etc.) displayed as white. In both embodiments, the auxilliary is to flash the entire screen white when a "hit" or other appropriate control signal is produced.

Figure 8:
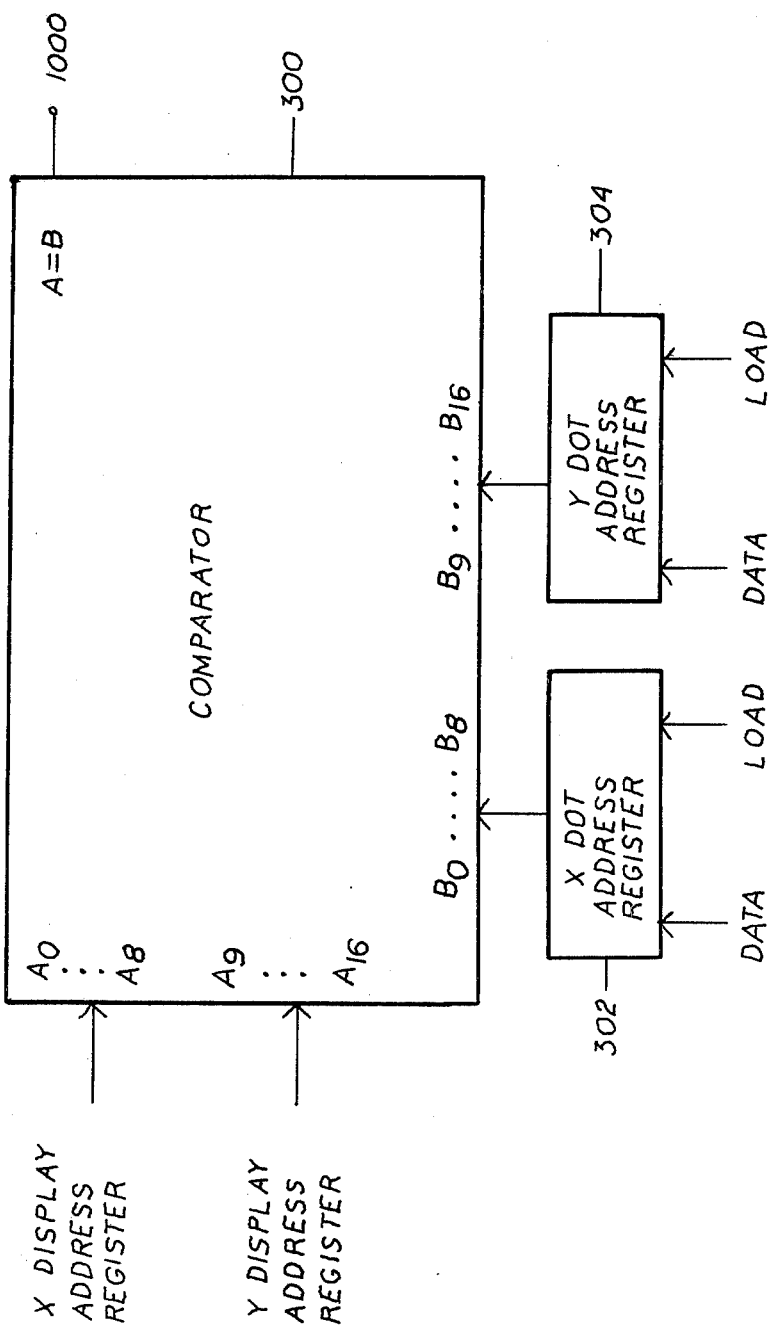
FIG. 8 shows the logic diagram of the dot or small matrix generator.

FIG. 8 shows a configuration for generating the dot display in which the X and Y display address registers 88 and 89 provide input to a second comparator 300. Also dot address registers 302 and 304 provide input to the comparator 300, when A=B an output is produced on line 1000 which goes to the video display.

FIG. 11 shows one way to implement change of position such as rotation of the matrix display. A double pole switch 818 (normally placed on the "joystick" shown in FIG. 13) controls the direction of rotation. "Nor" gates 802 and 804 sense the presence of a control signal and when coupled to "Nand" gates 806 and 808 as the case may be along with the output of oscillator 810 cause counter 812 to count up or down and change the matrix address. Oscillator 810 frequency determines the rate of rotation.

FIGS. 13, 13A and 13B show an embodiment of a "joystick" or control unit having a generally cylindrical shape. A sound effect outlet (speaker normally) 860 is mounted in the control along with control buttons for controlling the attitude (rotation) and speed of the matrix being displayed. This arrangement eliminates the need for different sound effects for each player.

Figure 14:
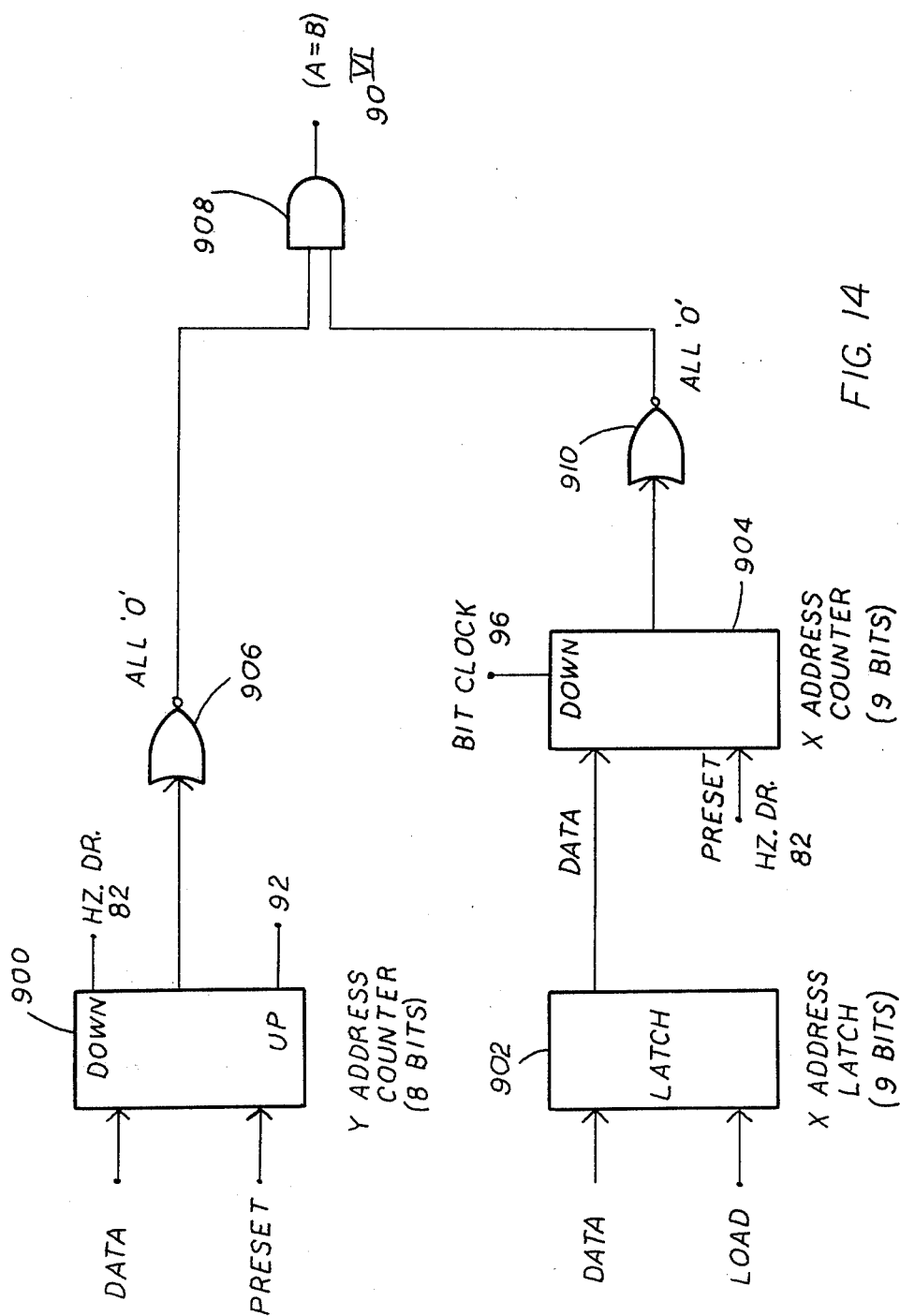
FIG. 14 shows a further embodiment of the present invention which the counters count "down" instead of "up."

FIG. 14 shows an embodiment of the present invention in which the counters count "down" to 0000 instead of "up" to the desired number such as 256 or 320. In this implementation all "0" indicates an equality. Thereby comparators are eliminated except in the generic sense in which the expression is used in the claims.

A copy of the program used in implementing the present invention with a particular two player space war game is enclosed with the specification to satisfy the completeness of disclosure of the patent law.

Words describing the logic functions performed by the circuit elements should be given their broadest generic meaning. Various different implementations of the present invention can easily be discerned by those skilled in the art. Those variations are intended to be covered by the appended claims.

What is claimed is:

1. A player control for a TV game comprising:
   a first cylindrical member having an outer surface and two ends;
   a plurality of control switch members disposed on said outer surface in position to be operated by the fingers and thumb of a player; and
   a loudspeaker disposed in one end of said cylindrical member for providing the player with audio signals relating to the TV game.

2. Playing apparatus that comprises in combination:
   a television receiver operable within a channel for television broadcasting having an image screen;
   an electronic controller for generating horizontal (X) and vertical (Y) coordinates of a point on said image screen;
   an electronic interface interconnecting said electronic controller with said television receiver;
   a matrix address means interacting with said electronic controller;
   a display address means interacting with said electronic controller;
   a matrix memory means interacting with said electronic controller;
   said controller including a data comparator means for comparing the outputs of said display address means and said matrix address means such that said matrix memory means may produce an appropriate output for display on said image screen when said display address means and said matrix address means outputs are equal;
   a matrix selector register means having P bits providing an input to said matrix memory means, said matrix memory means having a bit storage capacity of at least $2^P$ times M times N bits where $2^P$ is the number of matrices to be stored, M is the vertical bit size and N is the horizontal bit size of the matrix to be displayed;
   said electronic controller further including a "1 of N" decoder responsive to said matrix memory means, a modulo M binary counter operative to provide an output to said matrix memory means, and a modulo N binary counter operative to provide an output to said "1 of N" decoder; and
   logic circuit means for controlling the output of said "1 of N" decoder in a selected sequence.

3. Playing apparatus in accordance with claim 2 in which said matrix address means and said display address means are digital devices.

4. Playing apparatus in accordance with claim 2 in which said matrix address means and said display address means are analog devices.

5. The playing apparatus in accordance with claim 2 in which said data comparator means is operative to provide input data to said logic circuit means.

6. The playing apparatus in accordance with claim 5 further including an oscillator means for providing the basic bit rate to drive at least said display address means and said logic circuit means.

7. The device in accordance with claim 2 further including:
   a control member in the form of a cylindrically shaped housing having an outer surface and at least one end portion;
   an audio generator disposed in said one end portion; and
   a plurality of control switch members disposed on the outer surface of said housing.

8. The device claimed in claim 7 further including a plurality of indicator members disposed on said outer surface of said housing.

* * * * *